US009968026B2

(12) United States Patent
Sudbrink

(10) Patent No.: US 9,968,026 B2
(45) Date of Patent: May 15, 2018

(54) APPARATUS AND METHOD FOR AN AGRICULTURAL IMPLEMENT FOLDING FRAME

(71) Applicant: CNH Industrial America LLC, New Holland, PA (US)

(72) Inventor: Matthew R. Sudbrink, Metamora, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days. days.

(21) Appl. No.: 15/289,515

(22) Filed: Oct. 10, 2016

(65) Prior Publication Data

US 2018/0098482 A1  Apr. 12, 2018

(51) Int. Cl.
| | | |
|---|---|---|
| A01B 49/00 | (2006.01) | |
| A01B 73/06 | (2006.01) | |
| A01B 73/04 | (2006.01) | |

(52) U.S. Cl.
CPC .......... *A01B 73/062* (2013.01); *A01B 73/048* (2013.01)

(58) Field of Classification Search
CPC ..... A01B 73/065; A01B 73/02; A01B 73/044; A01B 73/048; A01B 73/046; A01B 73/00; A01B 73/04; A01B 73/06
USPC .......................... 172/311, 140, 459
See application file for complete search history.

(56) References Cited

U.S. PATENT DOCUMENTS

| | | | | |
|---|---|---|---|---|
| 2,787,477 A | * | 4/1957 | Melroe | A01B 39/24 172/311 |
| 3,539,016 A | * | 11/1970 | Bauer | A01B 73/02 172/311 |
| 3,548,954 A | * | 12/1970 | Lindemann | A01B 73/02 172/311 |
| 3,866,688 A | | 2/1975 | Hansen | |
| 3,967,684 A | | 7/1976 | Haverdink | |
| 4,271,711 A | | 6/1981 | Vavra | |
| 4,336,846 A | | 6/1982 | Boetto | |
| 4,355,690 A | | 10/1982 | Jensen et al. | |
| 4,415,043 A | | 11/1983 | Hadler et al. | |
| 4,418,763 A | | 12/1983 | Boetto | |
| 4,529,040 A | * | 7/1985 | Grollimund | A01B 73/02 111/57 |
| 4,576,238 A | * | 3/1986 | Spencer | A01B 73/065 172/311 |
| 5,839,516 A | | 11/1998 | Arnold et al. | |
| 5,921,325 A | | 7/1999 | Meek et al. | |
| 6,092,609 A | | 7/2000 | Jeffery et al. | |

(Continued)

OTHER PUBLICATIONS

"Estimating Floor Space for Farm Equipment Storage", Robert D. Grisso and Gerald R. Badman, Nebraska Cooperative Extension NF95-226, Aug. 1995 (5 pages).

*Primary Examiner* — Arpad Fabian-Kovacs
(74) *Attorney, Agent, or Firm* — Rebecca L. Henkel; Rickard K. DeMille

(57) ABSTRACT

A large field cultivator has forward and rear wing frames that are articulated to a main frame between a field position in which they extend laterally and a transport position in which they pivot forward and rearward about an axis substantially perpendicular to the plane of the frames in the field position. A pair of flip up frames secured to the aft frames pivot out of the way so that the rear wing frame assemblies may be pivoted inward to the transport position.

12 Claims, 4 Drawing Sheets

(56) References Cited

U.S. PATENT DOCUMENTS

| | | | |
|---|---|---|---|
| 6,202,756 B1* | 3/2001 | Hundeby | A01B 63/32 |
| | | | 172/311 |
| 6,220,366 B1 | 4/2001 | Noonan et al. | |
| 6,374,921 B1* | 4/2002 | Friggstad | A01B 73/065 |
| | | | 172/311 |
| 7,469,648 B2 | 12/2008 | Bettin | |
| 7,581,597 B2* | 9/2009 | Neudorf | A01B 73/067 |
| | | | 172/1 |
| 7,712,544 B1* | 5/2010 | Misenhelder | A01B 73/065 |
| | | | 172/311 |
| 7,740,084 B2* | 6/2010 | Rosenboom | A01B 51/04 |
| | | | 172/292 |
| 7,854,272 B2 | 12/2010 | Friggstad et al. | |
| 8,176,992 B2* | 5/2012 | Yuen | A01B 73/048 |
| | | | 172/311 |
| 8,342,256 B2 | 1/2013 | Adams et al. | |
| 8,567,517 B2* | 10/2013 | Friggstad | A01B 63/32 |
| | | | 172/140 |
| 8,636,078 B2* | 1/2014 | Yuen | A01B 73/048 |
| | | | 172/311 |
| 8,770,309 B2* | 7/2014 | Bauer | A01B 73/065 |
| | | | 111/57 |
| 8,820,429 B2* | 9/2014 | Knobloch | A01C 23/023 |
| | | | 172/311 |
| 9,516,798 B2* | 12/2016 | Sudbrink | A01B 73/065 |
| 2007/0240889 A1 | 10/2007 | Neudort et al. | |
| 2011/0315411 A1* | 12/2011 | Adams | A01B 73/02 |
| | | | 172/311 |
| 2012/0298388 A1 | 11/2012 | Bauer | |

\* cited by examiner

APPARATUS AND METHOD FOR AN AGRICULTURAL IMPLEMENT FOLDING FRAME

BACKGROUND OF THE INVENTION

1. Field of the Invention

The present invention relates to agricultural implement, and, more specifically to folding frames for such implements.

2. Description of the Related Art

In the quest for greater efficiency in agricultural operations, a demand has been placed on field cultivating implements to achieve a lateral width that is ever increasing. Increased lateral widths of up to over 80 feet wide for a single machine allow a farmer to cultivate a wider swath of field for a given pass of the implement. However, the field cultivator must be transported between fields and during the transport operation it must fit within the height and width regulations of governments for over the highway clearance requirements. In an attempt to do this, frame members for the agricultural implements have been articulated to one another so that they may extend laterally a maximum width and then are folded on top of one another and forward to minimize the cross section of the implement in a transport position. The need to achieve ever greater width strains the ability of the current arrangements to fit within the highway requirements for a transport position.

Accordingly, what is needed in the art is a folding frame member having a minimum cross section for the transport position.

SUMMARY OF THE INVENTION

The present invention seeks to achieve that in a configuration that is easily achieved.

In one form, the invention is a folding frame for an agricultural implement having ground support wheels secured thereto and ground engaging components supported by a frame. The frame includes a main frame member and at least one inner wing frame member articulated to the main frame member between a field position in which it extends laterally and in substantially the same plane as the main frame member and a transport position wherein it is pivoted about an axis that is substantially perpendicular to the plane of the main frame member. A main frame flip frame member is articulated to the inner wing frame member between a field position in which it is in substantially the same plane as the inner wing frame member and the main frame and a transport position in which it is pivoted out of the plane of the inner frame member so that when the inner wing frame member is pivoted it occupies the space previously occupied by the main frame flip frame member.

The invention, in another form, is directed to a method for folding a frame for an agricultural implement having a main frame and at least one inner wing frame member articulated to the main frame for extended field position and a transport position and a flip frame member articulated to the inner wing frame member. The method includes the steps of pivoting the flip frame member out of the plane of the inner wing member and pivoting the inner wing frame member to extend aft from the main frame into the space previously occupied by the flip frame member.

An advantage of the present invention is that agricultural implements of ever increasing lateral span may be transported between fields within existing governmental clearance limitations.

Another advantage is that the agricultural implements may also have minimal reduced height clearance requirements during the transport position.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
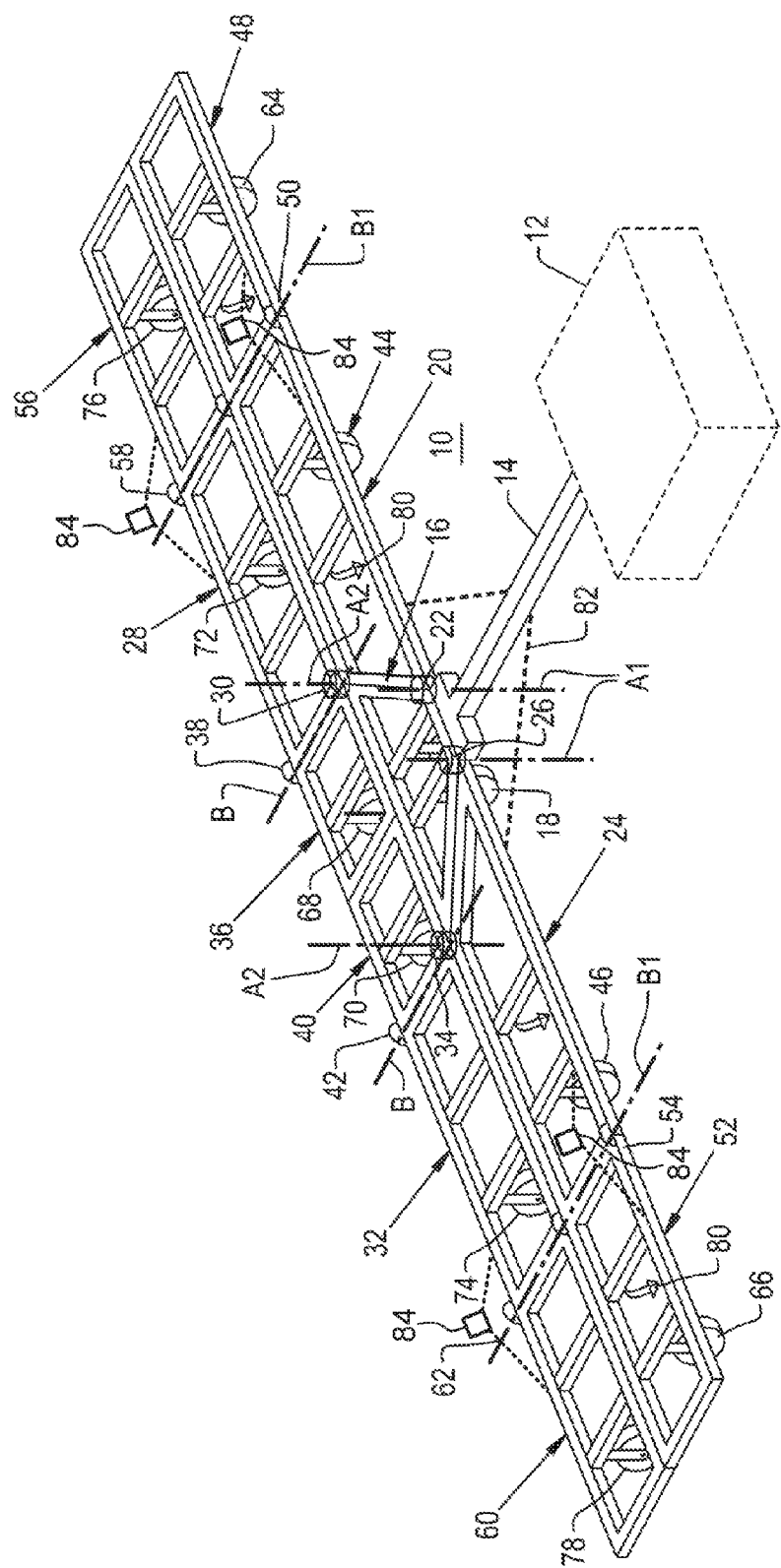
FIG. 1 is a perspective view of an agricultural implement embodying the present invention in a field position.

Referring now to the drawings, and more particularly to FIG. 1, there is shown a large field cultivator 10. The field cultivator 10 is used to prepare the soil in a field for planting of various crops. The frame of the cultivator 10 is discussed primarily and certain details of structural bracing are omitted to more clearly focus on the present invention. It should be understood to those skilled on the art that appropriate structural configurations will be incorporated to provide proper strength and rigidity. The agricultural implement 10 is typically towed by a tractor 12, shown schematically. A telescoping hitch 14 extends in a forward direction for connection with the tractor 12. The telescoping hitch 14 extends forward from a main frame 16 having main frame lift wheel assemblies 18 providing the support for the implement 10. The main frame 16 and associated frames are illustrated as simple ladder type frames having frame members describing the periphery with intermediate cross frames. In this instance, the cross frames serve to support the wheel assemblies and any ground engaging components provided for the implement 10. It should be pointed out that the ladder frame is for illustration purposes only and that the frames may take on any one of a variety of configurations to meet load and equipment requirements.

Figure 2:
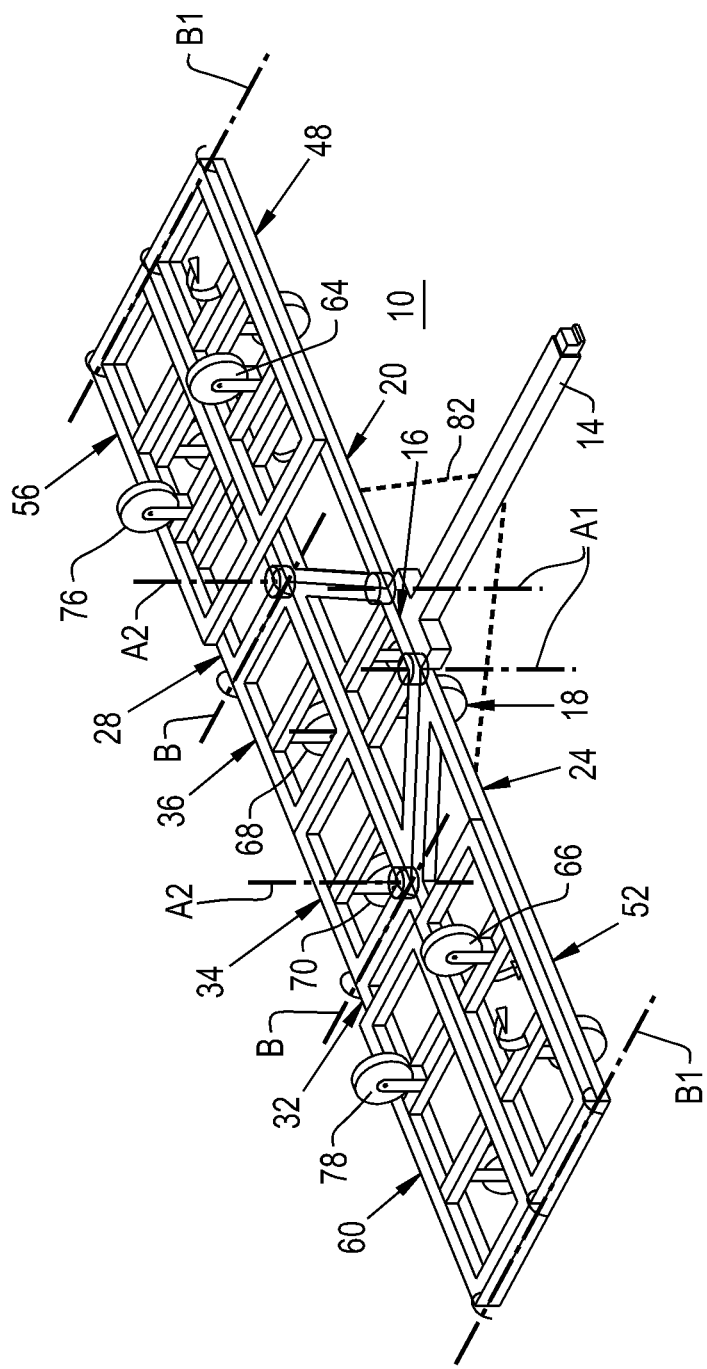
FIG. 2 is a perspective view of the implement in a first stage of transformation from the field position of FIG. 1.

The subsequent discussion of additional frames is described from a view behind the implement 10 looking forward in the direction of the tractor 12. A left forward inner wing frame 20 is secured to mainframe 16 at a pivotal mounting 22 for pivotal mounting between the illustrated field position in FIG. 1 and a fully configured transport position in FIG. 4 about an axis A1 that is substantially perpendicular to a plane encompassing main frame 18 and left forward inner wing frame 20. A right forward inner wing frame 24 is secured to the right of main frame 18 at a pivotal mounting 26, also pivoting about the axis A1 between the field position of FIG. 1 and the transport position of FIG. 4. A left rear inner wing frame 28 is secured to the aft portion of main frame 16 at a pivotal mounting 30 for pivotal movement between the field position of FIG. 1 and the transport position of FIG. 2 about an axis A2 which is also substantially perpendicular to the plane of the frames in FIG. 1. A right rear inner wing frame 32 is secured to the rear end of main frame 16 at a pivotal mounting 34 which allows pivoting movement also about axis A2.

The main frame 16 is shown as an isosceles trapezoid with the pivotal mountings 22 and 26 at the ends of the shorter base and the pivotal mountings 30 and 34 at the ends of the longer base. The inner edges of the left and right inner wing frames 20 and 24 are configured to mate with the main frame 16 in the field position. It should be apparent to those skilled in the art that other forms may be employed to achieve the same interconnection.

A left main frame flip up wing frame 36 is secured to left rear inner wing frame 28 at a pivotal mounting 38 for relative pivoting movement about an axis B which extends substantially in a forward and rear direction adjacent the plane of the frame members established in the field position of FIG. 1. A right main frame flip up wing frame 40 is secured to right rear inner wing frame 32 at a pivotal mounting 42 also about an Axis B which extends substantially in a forward and rear direction adjacent the plane of the frames in the field position.

Figure 4:
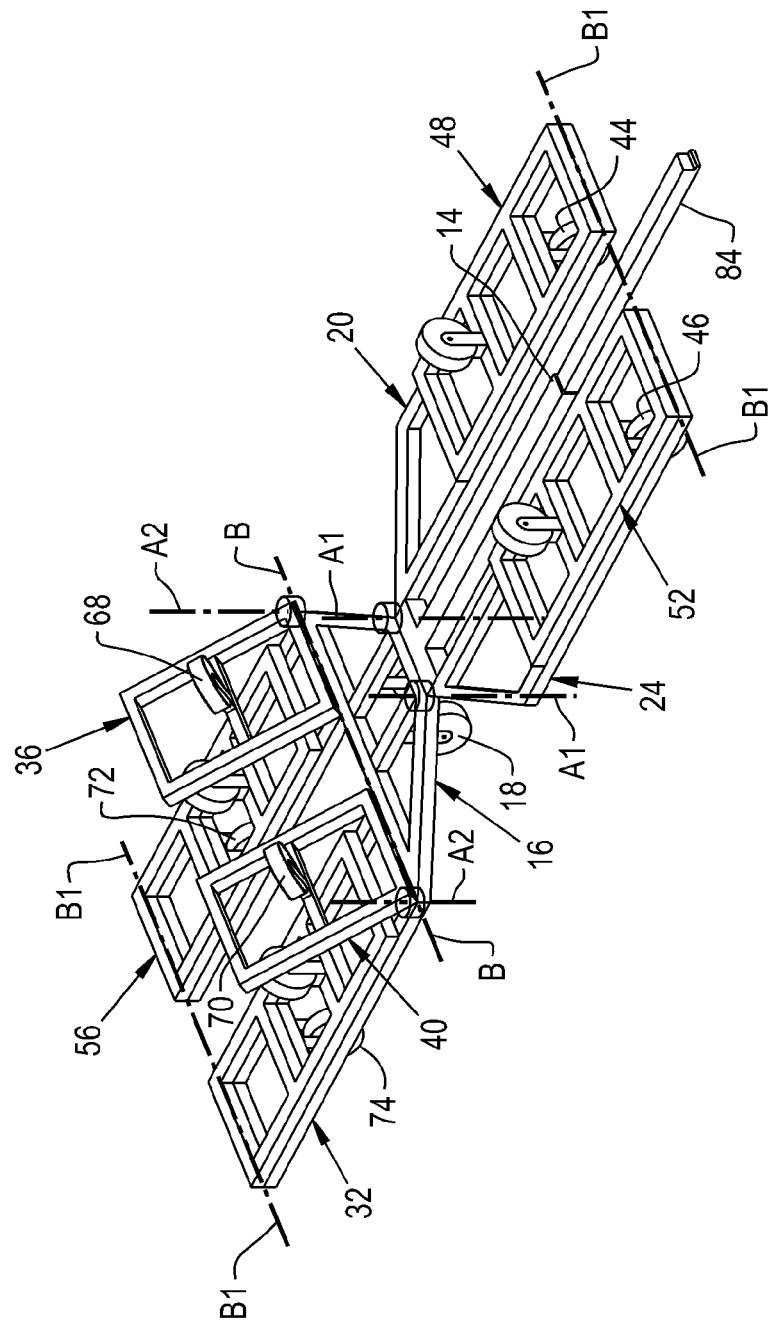
FIG. 4 is the final transformation of the agricultural implement of FIG. 1 to a transport position.

A left forward inner wing wheel assembly 44 is appropriately structurally connected to left forward inner wing frame 20 for supporting it during the field position and during the transport position of FIG. 4. The left forward inner wheel assembly is established to be a fixed wheel assembly during the field position of FIG. 1 and is a castoring wheel assembly during the transport position of FIG. 4. A right forward inner wing wheel assembly 46 is appropriately structurally connected to the right forward inner wing frame 24 and is a fixed wheel assembly during the field position and a castoring wheel assembly during the transport position of FIG. 4.

Additional lateral width may be provided to the agricultural implement 10 by a left forward outer wing frame 48 secured to left forward inner wing frame 20 at a pivotal mounting 50. The left forward outer wing frame is articulated so that it can pivot from the field position of FIG. 1 in which it is substantially in the same plane as the other frame members to flip over onto the left forward inner wing frame 20. A right forward outer wing frame 52 is connected to right forward inner wing frame 24 at a pivotal mounting 54. Both left and right outer forward wing frame members frames 48 and 52 pivot about an axis B1 which also extends substantially in a forward and rear direction and is adjacent the same plane as the frames in the field position of FIG. 1. The right forward outer wing frame 52 is also pivotable to fold over on top of right forward inner wing frame 24. A left rear outer wing frame 56 is secured to left rear inner wing frame 28 at a pivotal mounting 58. A right rear outer wing frame 60 is connected to right rear inner wing frame 32 at a pivotal mounting 62. The left and right rear outer wing frames 56 and 60 are also pivotable to fold over on their respective inner wing frames substantially about the axis B1.

A left main frame flip up wing frame wheel assembly 68 is appropriately connected to left main frame flip up wing frame 36 for establishing its height in supporting it for ground movement. A right main frame flip up wing frame wheel assembly is appropriately connected to flip up frame 40 for the same purpose. The wheel assembly 68 and 70 are configured to be fixed wheel assemblies that support and establish the height of the respective flip up frames.

A left rear inner wing frame wheel assembly 72 is connected to left inner wing frame 28. A right rear inner wing frame wheel assembly 74 is connected to the right rear inner wing frame 32. Wheel assemblies 72 and 74 are configured to be fixed wheel assemblies in the field position shown in FIG. 1 and castoring wheel assemblies in the transport position of FIG. 4.

A left rear outer wing frame wheel assembly 76 is appropriately connected to left rear outer wing frame 56. A right rear outer wing frame wheel assembly 78 is secured to right rear outer wing frame 60. Wheel assemblies 76 and 78 are configured to be fixed wheel assemblies directing the outer wing frames in a forward direction and also supporting and setting their heights.

All of the wheel assemblies are configured to establish and control the height of the frames above the soil in the field position of FIG. 1.

The agricultural implement 10 is set up to support a plurality of ground engaging components 80 of a wide variety of types in addition to the illustrated ground engaging component. It should be apparent to those skilled in the art that many ground engaging components may be employed on the agricultural implement 10 as needed for a particular type of farming operation.

Figure 3:
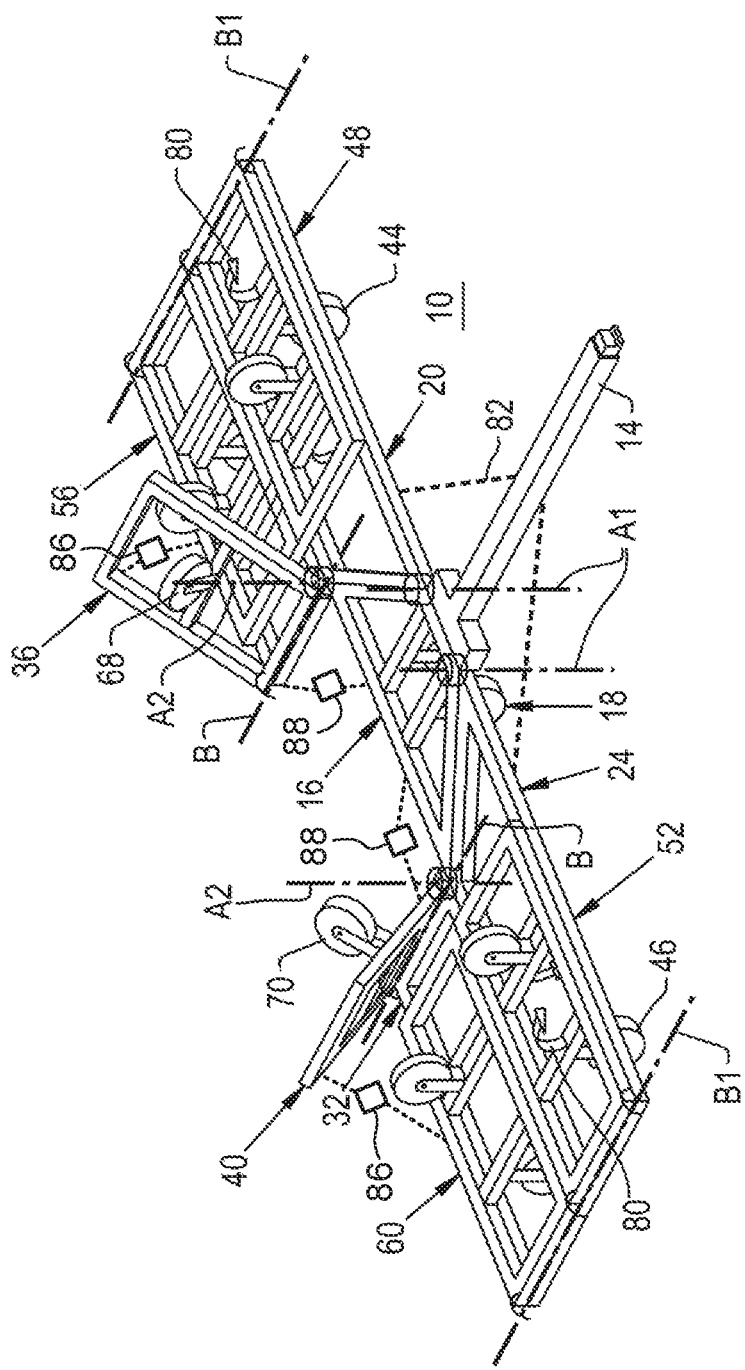
FIG. 3 is a second stage of transformation of the agricultural implement from the field position of FIG. 1.

The articulated frames discussed above are described as being positioned between the field position of FIG. 1 and the transport position of FIG. 4 with intermediate configurations. These are achievable by pivoting around their respective axes described above. As would be typical for the art, actuator mechanisms would be employed to move the frames between the field position and transport position. An example of just one actuator linkage is shown schematically as 82 to pivot right and left forward inner wing frames 20 and 24 about axis A1. Another example is found in actuators 84 for pivoting the outer wings between their field and transport position, as shown in FIG. 1. Additional examples are shown in actuators 86 to pivot the main frame flip up frames 36 and 40 between their transport and field positions, as shown in FIG. 3. In addition, FIG. 3 shows actuators 88 for pivoting the rear inner wing frames 56 and 60 between their transport and field position. It should be understood to those skilled in the art that the schematic actuators may be implemented in any one of a number of configurations. The schematic representation of actuators for the frames have been omitted in some of the Figures to provide greater clarity in the articulation of the frame members. It should be apparent to those skilled in the art that suitable actuators may be employed to manipulate the frames between their field position of FIG. 1 and transport position of FIG. 4.

The discussion of the folding operation will proceed from the configuration shown in FIG. 1 in which the agricultural implement is deployed in a field. In this position, the frames are substantially in a single plane extending to a maximum lateral width and towed in a forward direction by tractor 12. All of the wheel assemblies are configured to have a fixed direction, but are adjustable to set the overall distance of the plane of the frames relative to the ground. When field operations are completed, the agricultural implement 10 is first moved to the configuration shown in FIG. 2 in which the right and left forward and rear outer wing frames are folded over on top of their inner wing frames.

When this is completed, the right and left main frame flip up frames 36 and 40 are pivoted to their illustrated position which forms approximately a 135° angle relative to their field position of FIG. 1 as shown in FIG. 3. It should be apparent, though that the purpose of flipping up the frames 36 and 40 is to clear the previously occupied space to the rear of main frame 16 and that a range of angles is permitted according to the clearance limitations of wheel assemblies and ground engaging components 80. Once the flip up frames 36 and 40 are out of the way, the left and right rear inner wing frames 28 and 32 are pivoted about their respective pivotal mountings 30 and 34 swing about the axis A2 to the position of FIG. 4 where the inner section of the frames 28 and 32 now occupies the space previously occupied by the flip frames 36 and 40. The left and right inner wing frames 20 and 24 are pivoted to the forward position wherein they extend alongside hitch 44. In order to accommodate the additional forward length of the frames 20 and 24, a telescoping attachment 84 is provided to hitch 14. As stated above, the wheel assemblies 44, 46, 72 and 74 are configured to be castoring wheels in the transport position of FIG. 4 so as to permit a movement that is substantially at a right angle to the field movement.

The configuration set out above allows agricultural implements of substantial lateral field position to be folded into a transport configuration that is significantly reduced to easily fall within the limits set forth by various governmental regulations. This enables an even greater lateral limit to be achieved in the field position while still maintaining a transport position in which the frames are adequately and appropriately supported for transport between fields. By having the pivotal axis A2 position at the forward edge of the rear inner wing frames, they are swung inward to minimize the transport width.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A folding frame for an agricultural implement having ground support wheels secured to the frame and ground engaging components supported by said frame for movement in a forward direction, said folding frame comprising:
   a main frame member;
   at least forward and rear inner wing frame members connected to said main frame member at pivotal connections for extending laterally relative to the travel direction to an elongated field position and pivoted to a transport position, the axis for said pivotal connection between said inner wing frame member and said main frame member extending substantially perpendicular relative to the plane of said main frame; and,
   a main frame flip frame member connected to said rear inner wing frame member at a pivotal connection, the axis of which extends in a forward and rear direction adjacent the plane of the frame in the field position, said main frame flip frame member being pivoted between a field position wherein it lies substantially within the plane of said rear inner wing frame member and a transport position in which it folds upward to at least 90° relative to the plane of said inner wing member whereby said rear inner wing member may be pivoted to the field position previously occupied by said main frame flip member during said transport position, said folding frame further comprising front and rear outer wing members each pivotally connected respectively to the front and rear inner frame members to fold between a field position wherein said front and rear outer wing members lie substantially in the plane of said inner wing frame members and a transport position in which they are pivoted through approximately 180°.

2. The folding frame as claimed in claim 1, having right and left inner wing frame members.

3. The folding frame as claimed in claim 1, wherein said main frame flip frame member is pivoted through an arc of approximately 135°.

4. The folding frame as claimed in claim 1, wherein said main frame is a trapezoid shape in plan view with the front inner wing member pivoted to the main frame member at its forward edge and the rear inner wing member is connected to the rear most corner of the base of the trapezoid, the front inner wing frame member having a shape at the junction with the main frame to achieve a straight lateral connection in the field position.

5. The folding frame as claimed in claim 1, further comprising a hitch for connecting to a towing vehicle, said hitch having a retracted condition for a field position and an extended length for the travel position.

6. The folding frame as claimed in claim 1, further comprising ground support wheels secured to and positioned on one side of said main frame and said at least one inner wing frame member.

7. The folding frame as claimed in claim 6, further comprising ground engaging components secured to and extending from the plane of the frame members on the same side as the ground support wheels.

8. A method of folding a frame for an agricultural implement moveable in a forward direction, wherein the implement has a main frame member, at least forward and rear inner wing frame members connected to the main frame member at a pivotal connection, the axis of which extends substantially perpendicular relative to the plane of the main frame, between an extended field position and a transport position and a main frame flip frame member connected to the at least one rear inner wing frame member at a pivotal connection, the axis of which extends in a forward and rear direction adjacent the plane of the frames in the field position, said method comprising the steps of:
   pivoting said flip frame member out of the plane of the said at least one rear inner wing frame member; and,
   thereafter pivoting said at least one rear inner wing frame member to extend in a rear direction from said main frame member in the space previously occupied by the main frame flip frame member.

9. The method as claimed in claim 8, wherein the method includes the step of:
   pivoting the forward inner wing frame member to extend in a forward direction.

10. The method as claimed in claim 9, having a pair of front and rear inner wing frame members.

11. The method as claimed in claim 9, wherein said frame is towed by a hitch and said method comprises the step of retracting the hitch to a field positon and extending the hitch for a transport position.

12. The method as claimed in claim 8, wherein said main frame flip frame member is pivoted through an arc of approximately 135°.

* * * * *